United States Patent Office 3,534,485
Patented Oct. 20, 1970

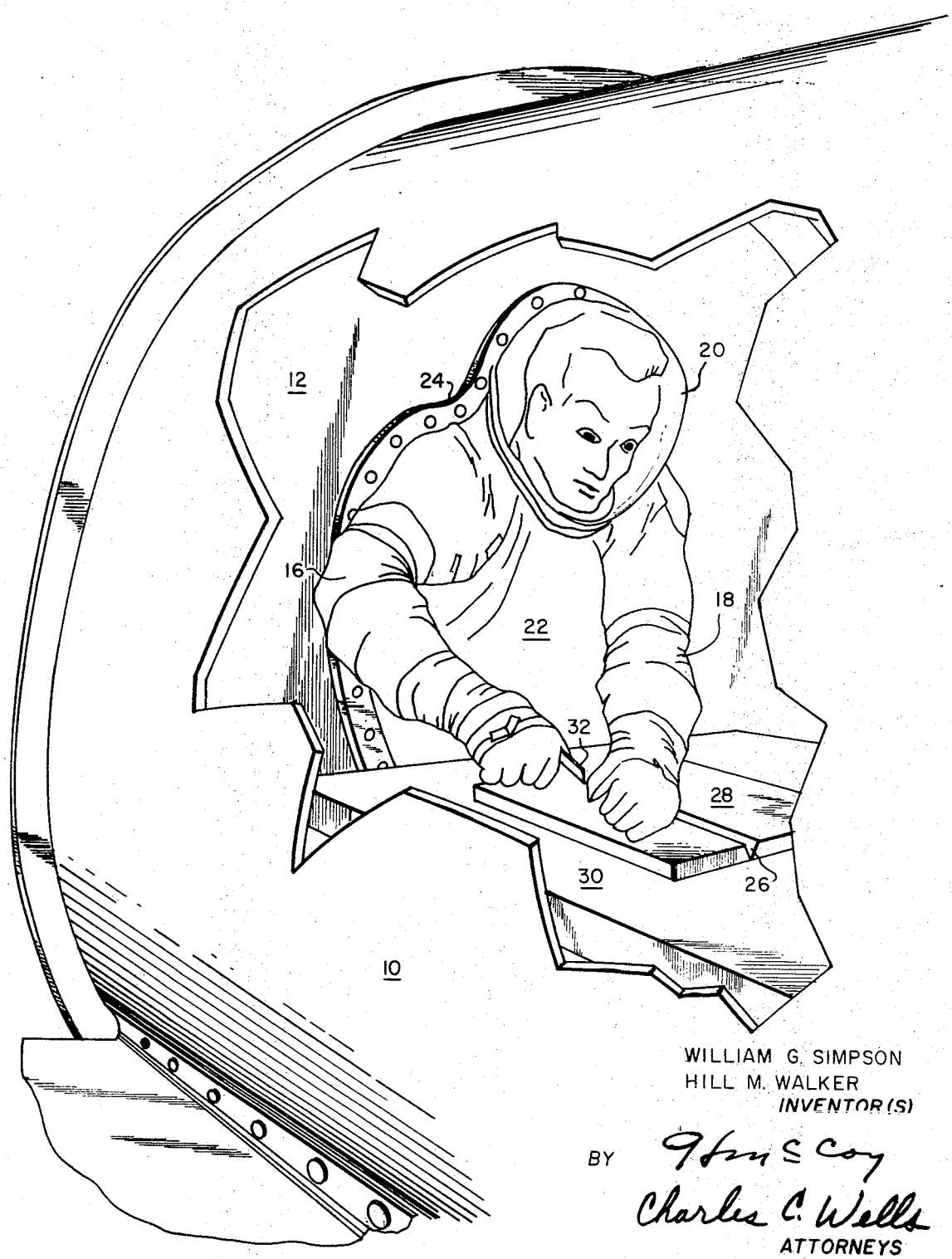

3,534,485
SPACE ENVIRONMENTAL WORK SIMULATOR
William G. Simpson, Huntsville, and Hill M. Walker, Guntersville, Ala., assignors to the United States of America as represented by the Administrator of the National Aeronautics and Space Administration
Filed Feb. 23, 1968, Ser. No. 707,495
Int. Cl. B64g 7/00
U.S. Cl. 35—12         1 Claim

ABSTRACT OF THE DISCLOSURE

A space simulator that includes an easy access vacuum chamber adapted to have vacuum pump connected thereto for pulling a hard vacuum within the tank. One wall of the vacuum tank has a port formed therein that is shaped so as to permit attachment of a portion of a space suit to the wall. The space suit portion attached to the wall includes both arms and a portion of a transparent head enclosure. The space suit is mounted to the wall in such manner that an operator positioned outside the tank can perform manipulations within the tank by insertion of his arms into the space suit arms. The operator can view his manipulations through the transparent head enclosure.

BACKGROUND OF THE INVENTION

The invention described herein was made by employees of the United States Government and may be manufactured and used by or for the Government for governmental purposes without the payment of any royalties thereon or therefor.

This invention relates in general to vacuum chambers and more particularly it relates to a vacuum chamber in which experiments can be performed in a hard vacuum environment and thus facilitate the terrestrial development and demonstration of processes in a simulated space environment.

The National Space Program has progressed to a point wherein it will soon be necessary for astronauts to perform experiments, maintenance and various other operations while in orbit about the earth or in space flight. Not only is it necessary that it be proven that man can perform various operations in a vacuum environment, it is also necessary that the materials and apparatus intended for such use be evaluated in a hard vacuum. Currently, operating techniques and material evaluation is performed in an atmospheric environment, or in a large vacuum chamber which must be man-rated and occupied by a space suited operator. Experimental functions performed under atmospheric conditions cannot offer information on the effects a vacuum environment has on the function and the performance of such functions in a manned vacuum chamber is costly, time consuming, and more importantly, hazardous.

SUMMARY OF INVENTION

The invention is an easy access vacuum chamber which makes it possible to simulate the carrying out of various physical operations in a vacuum environment similar to that encountered in outer space. This is made possible by mounting portions of a space suit to the wall of a vacuum chamber in such manner that an operator standing outside the chamber can get into or put on the space suit and perform manipulations on or experiments with materials that have been placed in the chamber. The invention provides an apparatus and method for conducting experiments in a simulated space environment that is relatively simple and very economical when compared to techniques employed heretofore.

Thus, an object of this invention is to provide an apparatus and method for simulating the hard vacuum conditions of outer space in a terrestrial environment. This and other objects will become more apparent when considering the detailed description of the invention which follows hereafter.

BRIEF DESCRIPTION OF DRAWING

The drawing is a pictorial view, partially broken away, of an easy access vacuum chamber that is being used by an operator.

DETAILED DESCRIPTION OF INVENTION

Referring now to the drawing which illustrates an operator in the process of carrying out an experiment in a vacuum chamber defined by an outer casing 10 having a cover 12 secured thereto by suitable latch means (not shown). The upper torso portion of a space suit; including arms 16 and 18, head enclosure or helmet 20, and body section 22, is mounted to the interior surface of cover 12 by a riveted or bolted flange 24. That portion of cover 12 outlined by flange 24 is of course removed to provide a port for operator access to the space suit attached to the cover. It is necessary that the flange and space suit be securely sealed to the interior surface of cover 12 to avoid leakage of air into the chamber when it is evacuated.

The space suit employed is a rigid, articulated structure that forms a pressure vessel able to withstand the pressure differential between the outside of the tank and the interior of the chamber when a hard vacuum is drawn within the tank. The interior of the space suit arms will be at atmospheric pressure when the tank is evacuated since they open to the outside of the tank. Actually, in effect the space forms part of the chamber wall.

The space suit portions are of a particular type having special joints formed by using constant volume techniques so as to not unduly hamper the movements of an operator using the chamber. A protective suit sufficiently strong to withstand the pressure differential between a hard vacuum such as that encountered in outer space, and a pressure near atmospheric such as is maintained within the suit, will render the occupant of the suit substantially immobile unless the suit is especially constructed. The intricacies of why the space or protective suit wearer is immobilized will not be discussed herein; suffice it to say that rigid protective suits have been developed having constant volume joints which do not drastically reduce the metabolic effectiveness of the wearer. In other words, a person wearing the suit can still move readily even though a considerable pressure differential exists between the interior and exterior of the suit.

Activities directed toward placing a man on the moon or in orbit about the earth for extended periods has generated a need to determine if certain processes and/or operations can be carried out in a vacuum environment. It is expected that unforseen difficulties could be encountered in a vacuum which would affect a process readily carried out on earth. Further, even if the materials used in an operation or experiment permit its use in a vacuum it is still necessary to know if an astronaut wearing a protective suit in a vacuum maintains sufficient manual dexterity to perform the process or operation.

It will be noted from the drawing that the operator is performing a cleaning operation by scraping the surface of a groove 26 formed in a piece of material 28. The material rests on support surface 30 positioned in the chamber and the scraping is done by a tool 32 grasped by the operator.

The operation and use of the invention is readily apparent and need not be discussed in any length. The materials to be used in a desired experiment are placed in the chamber by opening cover 12 or any other suitable access means (not shown) that has been provided. The chamber is then closed and sealed and a hard vacuum drawn in the chamber. The vacuum pumping equipment is not shown herein since equipment capable of evacuating the chamber is well known and available. The operator then inserts his arms and upper body, including his head, into the space suit portions mounted to the cover and conducts the experiment.

This completes the detailed description of the invention and while a preferred exemplary embodiment has been described herein there will be many changes and modifications to the invention which can be made by one skilled in the art to which it pertains without departing from the spirit and scope of the invention as defined in the claim appended hereto. For example, the vacuum chamber could be modified and positioned such that the entire upper half of a space suit is mounted to a lower surface of a vacuum chamber. In this position the operator could be provided with a support where he could sit in the upper half of the space suit and conduct his experiment in the vacuum chamber.

What is claimed is:

1. A space simulator for carrying out experiments in a simulated space environment comprising:
- a vacuum tank that includes access means for placing materials to be experimented with in said tank and means for evacuating the tank;
- an upper front torso portion of a space suit, including both arms thereof and a portion of a transparent head enclosure, attached to one wall of said vacuum tank and extending into said vacuum tank;
- a port formed in said one wall of the vacuum tank that is arranged and shaped so as to permit an operator positioned outside said vacuum tank to place his arms into the space suit arms and conduct an experiment in the vacuum tank while viewing the experiment through the transparent head enclosure portion;
- said space suit upper front torso portion forming a rigid articulated structure that forms in effect a portion of the vacuum tank wall capable of withstanding the pressure differential that exists between the interior and exterior of the tank when a hard vacuum is drawn within the tank and yet permits easy movement of the space suit arms when such pressure differential exists, whereby carrying out of experiments within the vacuum tank while it is evacuated is facilitated; and
- a flange member that secures the space suit portion to said one wall of said vacuum tank around the edges of said port formed therein.

References Cited

UNITED STATES PATENTS

| | | | |
|---|---|---|---|
| 2,862,307 | 12/1958 | Bloomer et al. | 128—1 X |
| 2,985,129 | 5/1961 | Kirkpatrick | 312—1 |
| 3,073,040 | 1/1963 | Schueller | 35—12 |
| 3,272,199 | 9/1966 | Matthews | 128—1 |
| 3,439,966 | 4/1969 | Perkins et al. | 312—1 |

EUGENE R. CAPOZIO, Primary Examiner

P. V. WILLIAMS, Assistant Examiner

U.S. Cl. X.R.

312—1